(12) United States Patent
Griffin

(10) Patent No.: US 8,976,120 B2
(45) Date of Patent: Mar. 10, 2015

(54) TACTILE TOUCHSCREEN FOR ELECTRONIC DEVICE

(75) Inventor: Jason Griffin, Kitchener (CA)

(73) Assignee: BlackBerry Limited, Waterloo (CA)

( * ) Notice: Subject to any disclaimer, the term of this patent is extended or adjusted under 35 U.S.C. 154(b) by 2247 days.

(21) Appl. No.: 11/837,754

(22) Filed: Aug. 13, 2007

(65) Prior Publication Data

US 2009/0046071 A1 Feb. 19, 2009

(51) Int. Cl.
*G06F 3/041* (2006.01)
*G06F 3/02* (2006.01)
*G06F 1/16* (2006.01)

(52) U.S. Cl.
CPC ............ *G06F 3/0202* (2013.01); *G06F 1/1626* (2013.01); *G06F 1/1643* (2013.01); *G06F 3/0414* (2013.01); *G06F 3/0416* (2013.01)
USPC ...................................... 345/173; 361/679.18

(58) Field of Classification Search
USPC .................... 345/173–178; 178/18.01–18.11; 349/12; 361/679.1, 679.18, 679.55, 361/679.56
See application file for complete search history.

(56) References Cited

U.S. PATENT DOCUMENTS

| | | | | |
|---|---|---|---|---|
| 5,977,867 | A | 11/1999 | Blouin | |
| 6,034,672 | A * | 3/2000 | Gaultier et al. | 345/173 |
| 6,118,435 | A | 9/2000 | Fujita et al. | |
| 6,664,991 | B1 | 12/2003 | Chew et al. | |
| 6,724,370 | B2 | 4/2004 | Dutta et al. | |
| 2002/0173344 | A1 | 11/2002 | Cupps et al. | |
| 2004/0108995 | A1 | 6/2004 | Hoshino et al. | |
| 2006/0109254 | A1 | 5/2006 | Akieda et al. | |
| 2006/0119586 | A1 | 6/2006 | Grant et al. | |
| 2006/0181517 | A1 | 8/2006 | Zadesky et al. | |
| 2006/0197753 | A1 | 9/2006 | Hotelling | |
| 2007/0146348 | A1 | 6/2007 | Villain | |

FOREIGN PATENT DOCUMENTS

| | | |
|---|---|---|
| DE | 20102197 U1 | 6/2001 |
| EP | 0640936 A1 | 3/1995 |
| EP | 1443386 A1 | 8/2004 |
| EP | 1450247 A1 | 8/2004 |

(Continued)

OTHER PUBLICATIONS

Office Action issued Feb. 18, 2010, in respect of corresponding Korean Patent Application No. 10-2008-0073385.

(Continued)

*Primary Examiner* — Jimmy H Nguyen
(74) *Attorney, Agent, or Firm* — Geoffrey deKleine; Borden Ladner Gervais LLP

(57) ABSTRACT

A portable electronic device includes a housing with a front frame; a moveable touch-screen display framed by the front frame of the housing, the moveable touch-screen display including a touch-sensitive input surface overlying a display device, the front frame including corners curved outwardly away from the surface of the touchscreen display; a mechanical switch disposed between a back surface of the touchscreen display and a base of the housing; and operational components including a processor within the housing and connected to the touchscreen display. The touchscreen display moves or pivots relative to the housing about a pivot axis in response to application of sufficient force on the touchscreen. This movement or pivoting results in the actuation of the single mechanical switch and the pivot axis depending on the location of application of the force.

10 Claims, 6 Drawing Sheets

(56) References Cited

FOREIGN PATENT DOCUMENTS

| | | |
|---|---|---|
| EP | 1691263 A1 | 8/2006 |
| GB | 2402105 | 12/2004 |
| JP | 2000-194505 A | 7/2000 |
| JP | 2000200141 | 7/2000 |
| JP | 2003-140828 A | 5/2003 |
| JP | 18-065507 | 3/2006 |
| WO | 03063128 A1 | 7/2003 |
| WO | 2004107146 A2 | 12/2004 |
| WO | 2006/088499 A1 | 8/2006 |
| WO | 2007057266 A1 | 5/2007 |

OTHER PUBLICATIONS

Examination Report from European Patent Application No. 07114273.1 dated Jun. 25, 2005.

Japanese Office Action dated Nov. 8, 2010, issued from the corresponding Japanese patent application.

* cited by examiner

TACTILE TOUCHSCREEN FOR ELECTRONIC DEVICE

FIELD OF TECHNOLOGY

The present application relates to input and output devices for portable electronic devices.

BACKGROUND

Portable electronic devices have gained widespread use and can provide a variety of functions including, for example, telephonic, electronic messaging and other personal information manager (PIM) application functions. Portable electronic devices can include several types of devices including mobile stations such as simple cellular telephones, smart telephones, wireless PDAs, and laptop computers with wireless 802.11 or Bluetooth capabilities. These devices run on a wide variety of networks from data-only networks such as Mobitex and DataTAC to complex voice and data networks such as GSM/GPRS, CDMA, EDGE, UMTS and CDMA2000 networks.

Devices such as PDAs or smart telephones are generally intended for handheld use and easy portability. Smaller devices are generally desirable for portability. A touchscreen input/output device is particularly useful on such handheld devices as such handheld devices are small and are therefore limited in space available for user input and output devices. Further, the screen content on the touchscreen input/output devices can be modified depending on the functions and operations being performed.

Touchscreen input/output devices are constructed of a display, such as a liquid crystal display, with a touch-sensitive overlay. These input/output devices suffer from inherent disadvantages relating to user interaction and response, however. In particular, such touchscreen input/output devices fail to provide a user-desirable tactile quality for positively indicating input, providing a poor user-experience.

Improvements in input/output devices are therefore desirable.

BRIEF DESCRIPTION OF THE DRAWINGS

Embodiments of the present application will now be described, by way of example only, with reference to the attached Figures, wherein.

DETAILED DESCRIPTION

Figure 1:
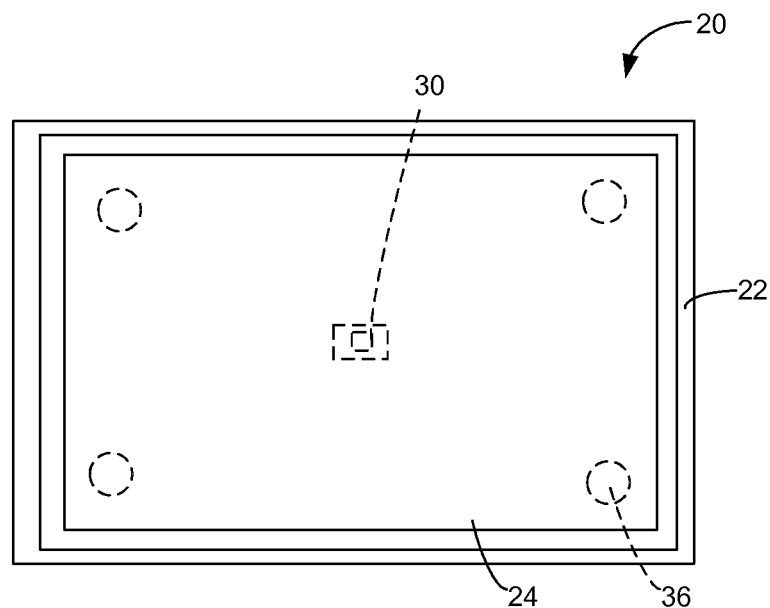
FIG. 1 is a top view of a portable electronic device according to one embodiment, with certain hidden features shown in ghost outline for the purpose of illustration.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

The embodiments described herein generally relate to a portable electronic device having a display. Examples of portable electronic devices include mobile, or handheld, wireless communication devices such as pagers, cellular phones, cellular smart-phones, wireless organizers, personal digital assistants, wirelessly enabled notebook computers and the like.

The portable electronic device may be a two-way communication device with advanced data communication capabilities including the capability to communicate with other portable electronic devices or computer systems through a network of transceiver stations. The portable electronic device may also have the capability to allow voice communication. Depending on the functionality provided by the portable electronic device, it may be referred to as a data messaging device, a two-way pager, a cellular telephone with data messaging capabilities, a wireless Internet appliance, or a data communication device (with or without telephony capabilities). The portable electronic device may also be a portable device without wireless communication capabilities as a handheld electronic game device, digital photograph album, digital camera and the like.

Figure 2:
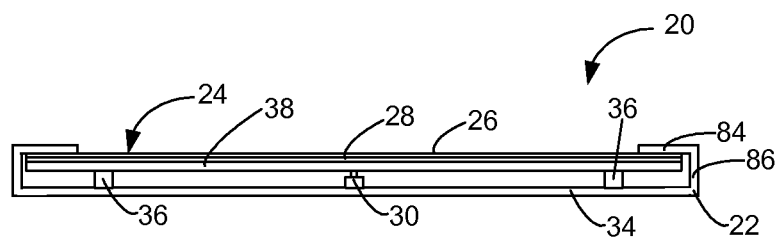
FIG. 2 is a sectional side view of the portable electronic device of FIG. 1.
Figure 3:
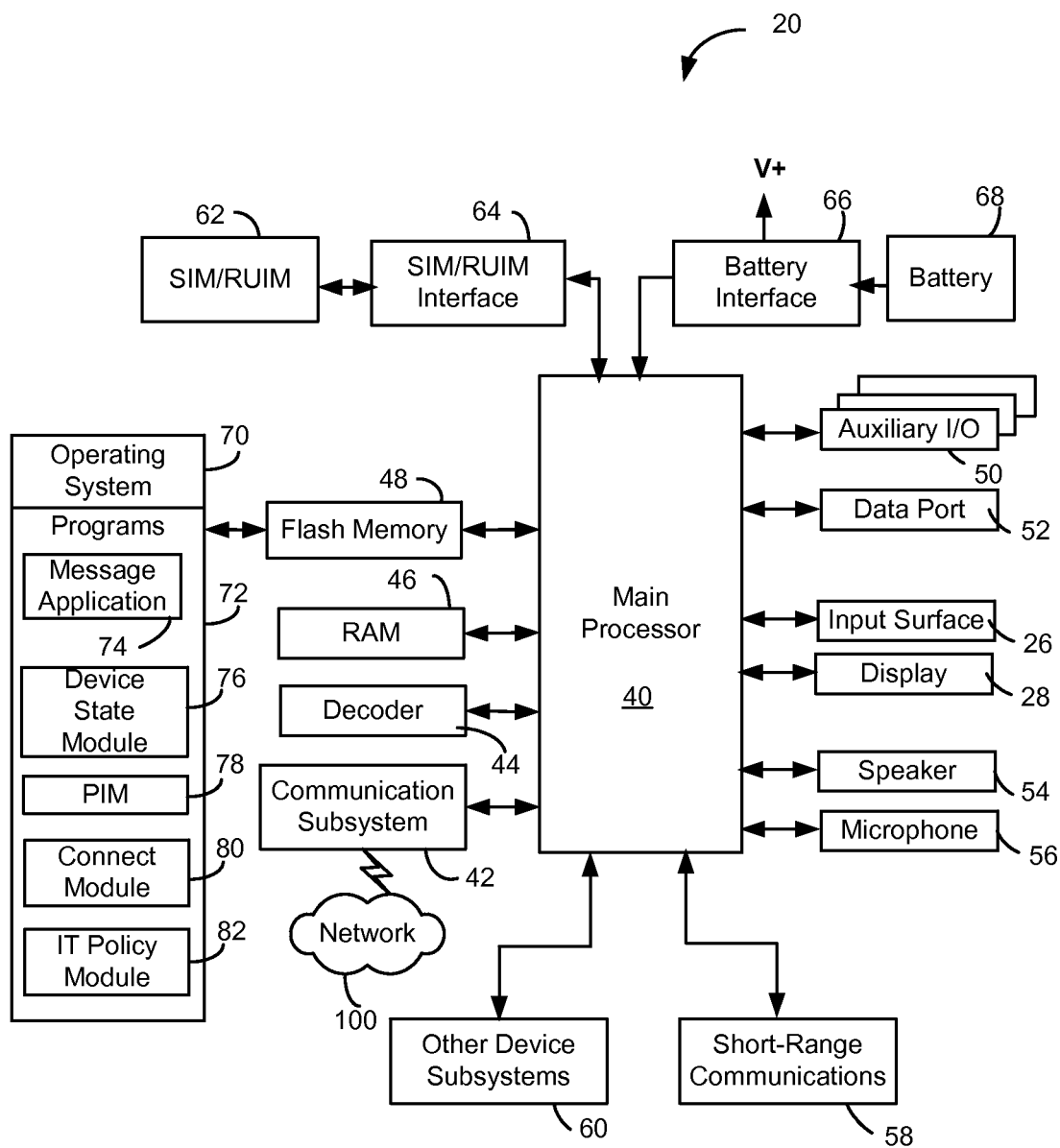
FIG. 3 is a block diagram of certain components, including certain internal components, of the portable electronic device of FIG. 1.

Referring to FIGS. 1 to 3, a portable electronic device 20 that includes a housing 22 and a moveable touchscreen display 24 constrained by the housing 22 is shown. The touchscreen display 24 includes a touch-sensitive input surface 26 overlying a display device 28. A single mechanical switch 30 is disposed between a back surface of the touchscreen display 24 and a base 34 of the housing 22. Operational components are provided including a processor 40 within the housing 22 and connected to the touchscreen display 24. The touchscreen display 24 pivots relative to the base 34 of the housing 22 about a pivot axis in response to application of sufficient force to an off-center location on the touchscreen display 24 resulting in actuation of the single mechanical switch 30. The pivot axis depends on the location of application of the force.

Referring now to FIG. 3, there is shown therein a block diagram of an exemplary embodiment of a portable electronic device 20. The portable electronic device 20 includes a number of components such as the processor 40 that controls the overall operation of the portable electronic device 20. Communication functions, including data and voice communications, are performed through a communication subsystem 42. Data received by the portable electronic device 20 can be decompressed and decrypted by decoder 44, operating according to any suitable decompression techniques (e.g. YK decompression, and other known techniques) and encryption techniques (e.g. using an encryption techniques such as Data Encryption Standard (DES), Triple DES, or Advanced Encryption Standard (AES)). The communication subsystem 42 receives messages from and sends messages to a wireless network 100. In this exemplary embodiment of the portable electronic device 20, the communication subsystem 42 is configured in accordance with the Global System for Mobile Communication (GSM) and General Packet Radio Services (GPRS) standards. The GSM/GPRS wireless network is used worldwide and it is expected that these standards will be superseded eventually by Enhanced Data GSM Environment (EDGE) and Universal Mobile Telecommunications Service (UMTS). New standards are still being defined, but it is believed that they will have similarities to the network behavior described herein, and it will also be understood by persons skilled in the art that the embodiments described herein are intended to use any other suitable standards that are developed in the future. The wireless link connecting the communication subsystem 42 with the wireless network 100 represents one or more different Radio Frequency (RF) channels, operating according to defined protocols specified for GSM/GPRS communications. With newer network protocols, these channels are capable of supporting both circuit switched voice communications and packet switched data communications.

Although the wireless network 100 associated with portable electronic device 20 is a GSM/GPRS wireless network in one exemplary implementation, other wireless networks may also be associated with the portable electronic device 20 in variant implementations. The different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA1000 networks, GSM/GPRS networks (as mentioned above), and future third-generation (3G) networks like EDGE and UMTS. Some other examples of data-centric networks include WiFi 802.11, Mobitex™ and DataTAC™ network communication systems. Examples of other voice-centric data networks include Personal Communication Systems (PCS) networks like GSM and Time Division Multiple Access (TDMA) systems. The processor 40 also interacts with additional subsystems such as a Random Access Memory (RAM) 46, a flash memory 48, the display 28 with the input surface 26, an auxiliary input/output (I/O) subsystem 50, a data port 52, a speaker 54, a microphone 56, short-range communications 58 and other device subsystems 60.

Some of the subsystems of the portable electronic device 20 perform communication-related functions, whereas other subsystems may provide "resident" or on-device functions. By way of example, the display 28 and the input surface may be used for both communication-related functions, such as entering a text message for transmission over the network 100, and device-resident functions such as a calculator or task list.

The portable electronic device 20 can send and receive communication signals over the wireless network 100 after network registration or activation procedures have been completed. Network access is associated with a subscriber or user of the portable electronic device 20. To identify a subscriber according to the present embodiment, the portable electronic device 20 uses a SIM/RUIM card 62 (i.e. Subscriber Identity Module or a Removable User Identity Module) to be inserted into a SIM/RUIM interface 64 in order to communicate with a network. The SIM card or RUIM 62 is one type of a conventional "smart card" that can be used to identify a subscriber of the portable electronic device 20 and to personalize the portable electronic device 20, among other things. In the present embodiment the portable electronic device 20 is not fully operational for communication with the wireless network 100 without the SIM card 62. By inserting the SIM card/RUIM 62 into the SIM/RUIM interface 64, a subscriber can access all subscribed services. Services may include: web browsing and messaging such as e-mail, voice mail, Short Message Service (SMS), and Multimedia Messaging Services (MMS). More advanced services may include: point of sale, field service and sales force automation. The SIM card/RUIM 62 includes a processor and memory for storing information. Once the SIM card/RUIM 62 is inserted into the SIM/RUIM interface 64, it is coupled to the processor 40. In order to identify the subscriber, the SIM card/RUIM 62 can include some user parameters such as an International Mobile Subscriber Identity (IMSI). An advantage of using the SIM card/RUIM 62 is that a subscriber is not necessarily bound by any single physical portable electronic device. The SIM card/RUIM 62 may store additional subscriber information for a portable electronic device as well, including datebook (or calendar) information and recent call information. Alternatively, user identification information can also be programmed into the flash memory 48.

The portable electronic device 20 is a battery-powered device and includes a battery interface 66 for receiving one or more rechargeable batteries 68. In at least some embodiments, the battery 68 can be a smart battery with an embedded microprocessor. The battery interface 66 is coupled to a regulator (not shown), which assists the battery 68 in providing power V+ to the portable electronic device 20. Although current technology makes use of a battery, future technologies such as micro fuel cells may provide the power to the portable electronic device 20.

The portable electronic device 20 also includes an operating system 70 and software components 72 to 82 which are described in more detail below. The operating system 70 and the software components 72 to 82 that are executed by the processor 40 are typically stored in a persistent store such as the flash memory 48, which may alternatively be a read-only memory (ROM) or similar storage element (not shown). Those skilled in the art will appreciate that portions of the operating system 70 and the software components 72 to 82, such as specific device applications, or parts thereof, may be temporarily loaded into a volatile store such as the RAM 46. Other software components can also be included, as is well known to those skilled in the art.

The subset of software applications 72 that control basic device operations, including data and voice communication applications, will normally be installed on the portable electronic device 20 during its manufacture. Other software applications include a message application 74 that can be any suitable software program that allows a user of the portable electronic device 20 to send and receive electronic messages. Various alternatives exist for the message application 74 as is well known to those skilled in the art. Messages that have been sent or received by the user are typically stored in the flash memory 48 of the portable electronic device 20 or some other suitable storage element in the portable electronic device 20. In at least some embodiments, some of the sent and received messages may be stored remotely from the device 20 such as in a data store of an associated host system that the portable electronic device 20 communicates with.

The software applications can further include a device state module 76, a Personal Information Manager (PIM) 78, and other suitable modules (not shown). The device state module 76 provides persistence, i.e. the device state module 76 ensures that important device data is stored in persistent memory, such as the flash memory 48, so that the data is not lost when the portable electronic device 20 is turned off or loses power.

The PIM 78 includes functionality for organizing and managing data items of interest to the user, such as, but not limited to, e-mail, contacts, calendar events, voice mails, appointments, and task items. A PIM application has the ability to send and receive data items via the wireless network 100. PIM data items may be seamlessly integrated, synchronized, and updated via the wireless network 100 with the portable electronic device subscriber's corresponding data items stored and/or associated with a host computer system. This functionality creates a mirrored host computer on the portable electronic device 20 with respect to such items. This can be particularly advantageous when the host computer system is the portable electronic device subscriber's office computer system.

The portable electronic device 20 also includes a connect module 80, and an information technology (IT) policy module 82. The connect module 80 implements the communication protocols that are required for the portable electronic device 20 to communicate with the wireless infrastructure and any host system, such as an enterprise system, that the portable electronic device 20 is authorized to interface with.

The connect module 80 includes a set of APIs that can be integrated with the portable electronic device 20 to allow the portable electronic device 20 to use any number of services associated with the enterprise system. The connect module 80 allows the portable electronic device 20 to establish an end-to-end secure, authenticated communication pipe with the host system. A subset of applications for which access is provided by the connect module 80 can be used to pass IT policy commands from the host system to the portable electronic device 20. This can be done in a wireless or wired manner. These instructions can then be passed to the IT policy module 82 to modify the configuration of the device 20. Alternatively, in some cases, the IT policy update can also be done over a wired connection.

Other types of software applications can also be installed on the portable electronic device 20. These software applications can be third party applications, which are added after the manufacture of the portable electronic device 20. Examples of third party applications include games, calculators, utilities, etc.

The additional applications can be loaded onto the portable electronic device 20 through at least one of the wireless network 100, the auxiliary I/O subsystem 50, the data port 52, the short-range communications subsystem 58, or any other suitable device subsystem 60. This flexibility in application installation increases the functionality of the portable electronic device 20 and may provide enhanced on-device functions, communication-related functions, or both. For example, secure communication applications may enable electronic commerce functions and other such financial transactions to be performed using the portable electronic device 20.

The data port 52 enables a subscriber to set preferences through an external device or software application and extends the capabilities of the portable electronic device 20 by providing for information or software downloads to the portable electronic device 20 other than through a wireless communication network. The alternate download path may, for example, be used to load an encryption key onto the portable electronic device 20 through a direct and thus reliable and trusted connection to provide secure device communication.

The data port 52 can be any suitable port that enables data communication between the portable electronic device 20 and another computing device. The data port 52 can be a serial or a parallel port. In some instances, the data port 52 can be a USB port that includes data lines for data transfer and a supply line that can provide a charging current to charge the battery 68 of the portable electronic device 20.

The short-range communications subsystem 58 provides for communication between the portable electronic device 20 and different systems or devices, without the use of the wireless network 100. For example, the subsystem 58 may include an infrared device and associated circuits and components for short-range communication. Examples of short-range communication standards include standards developed by the Infrared Data Association (IrDA), Bluetooth, and the 802.11 family of standards developed by IEEE.

In use, a received signal such as a text message, an e-mail message, or web page download is processed by the communication subsystem 42 and input to the processor 40. The processor 40 then processes the received signal for output to the display 28 or alternatively to the auxiliary I/O subsystem 50. A subscriber may also compose data items, such as e-mail messages, for example, using the keyboard 116 in conjunction with the display 28 and possibly the auxiliary I/O subsystem 50. The auxiliary subsystem 50 may include devices such as: a mouse, track ball, infrared fingerprint detector, or a roller wheel with dynamic button pressing capability. A keyboard can also be provided, such as an alphanumeric keyboard and/or telephone-type keypad. A composed item may be transmitted over the wireless network 100 through the communication subsystem 42.

For voice communications, the overall operation of the portable electronic device 20 is substantially similar, except that the received signals are output to the speaker 54, and signals for transmission are generated by the microphone 56. Alternative voice or audio I/O subsystems, such as a voice message recording subsystem, can also be implemented on the portable electronic device 20. Although voice or audio signal output is accomplished primarily through the speaker 54, the display 28 can also be used to provide additional information such as the identity of a calling party, duration of a voice call, or other voice call related information.

Referring again to FIGS. 1 and 2, the housing 22 includes the base 34 and a frame 84 spaced from the base 34 that frames the touchscreen display 24. Sidewalls 84 extend between the base 34 and the frame 84. According to the present embodiment, the sidewalls 86 extend generally perpendicular to the base 34 and the frame 84. The base 34 includes a plate (not shown) that is releasably attached for insertion and removal of, for example, the battery 68 and the SIM card 62 described above. It will be appreciated that the base 34, the sidewalls 86 and the frame 84 can be injection molded, for example. The frame 84 is sized and shaped to frame a window in which the touchscreen display 24 is exposed for input by user contact with the input surface 26 of the touchscreen display 24 and for displaying output on the display device 28. Edges of the touchscreen display 24 contact the underside of the frame 84, as shown in FIG. 2 such that the frame 84 maintains the touchscreen display 24 within the housing 22. Thus, the touchscreen display 24 is constrained by the housing 22. It is contemplated that the edges of the touchscreen display 24 can include an edge support surrounding the edges to provide support and thus, the edge support contacts the frame 84 of the housing 22. According to the embodiment shown in FIG. 1, the frame 84 is generally rectangular although other shapes are possible. For example, the corners of the frame 84 can be rounded.

The touchscreen display 24 is supported by a rigid display support 38 to provide structural support to the touchscreen display 24 and inhibit bending causing damage or breaking of the touchscreen display 24. The display support 38 can be formed of any suitable material and can include further functional components such as a printed circuit board. It will be appreciated that the touchscreen display 24 is an assembly of components including, the touch-sensitive input surface 26 overlying the LCD display device 28 and other components including optional components such as a backlight (not shown). The touchscreen display 24 is biased away from the base 34 of the housing 22, toward the frame 84 by biasing elements 36 such that the edges of the touchscreen display 24 are in contact with the underside of the frame 84. According to the present embodiment, four biasing elements 36 are located between the base 34 and the touchscreen display 24, each biasing element 36 being located near a respective corner of the touchscreen display 24. Each of the four biasing elements 36 contact the display support 38. The biasing elements 36 are made of a suitable material such as foam that, with the application of a suitable force to the touch screen display 24, permits movement of the touchscreen display 24 within the housing 22. The biasing elements 36 are not limited to foam as any suitable biasing element such as a spring or springs can be employed. It will be appreciated that other numbers of biasing elements 36 can be used and, in fact, the biasing element can be, for example, a continuous element that extends around, proximal the periphery of the touchscreen display 24. Further, the touchscreen display 24 can be biased by the mechanical switch 30, rather than employing the biasing elements 36.

Also located between the touchscreen display 24 and the base 34 of the housing 22 is the single mechanical switch 30. The mechanical switch 30 is centered with respect to the touchscreen display 24 and located such that displacement of the touchscreen display 24 resulting from a user pressing the touchscreen display 24 actuates the mechanical switch 30. In the present embodiment, the mechanical switch 30 is located such that the actuator is in contact with the display support 38. Thus, depression of the touchscreen display 24 by user application of a force thereto, causes actuation of the mechanical switch 30, thereby providing the user with a positive tactile quality during user interaction with the user interface of the portable electronic device 20.

The components including the processor 40 and other components described above with reference to FIG. 3 are housed within the housing 22 to provide the functionality of the portable electronic device 22.

As indicated above, the touchscreen display 24 includes a display device 28 and the touch-sensitive input surface 26 overlying the display device 28 for providing a graphical user interface for user-input. The touchscreen display 24 generates signals when a user touches the touchscreen display 24 or slides a finger along the touchscreen display 24, resulting in the initiation of commands at the processor 40. The touchscreen display 24 provides a graphical user interface for user interaction. Thus, the display device 28 provides graphical representations that are selectable or manipulatable by user interaction with the touch-sensitive input surface 26 of the touchscreen display 24.

The mechanical switch 30 provides a second input device as actuation of the mechanical switch 30 by user application of a sufficient force generates a further signal input to the processor 40. The further signal from the actuation of the mechanical switch 30 can cause the initiation of commands at the processor 40, either alone or resulting from the combination of the signal from the mechanical switch and signals from the touch sensitive input surface 26. Thus, commands initiated at the processor 40 can be a result of the signal generated from the single mechanical switch 30 alone or a result of the signal generated from the single mechanical switch 30 in combination with signals from the touch sensitive input surface 26 caused by user interaction. User interaction can be, for example, the user touching the touchscreen display 24 or the user sliding a finger along the touchscreen display 24. Different sliding actions of the finger along the touchscreen display 24 can also result in different commands initiated at the processor 40.

It will also be appreciated that the user of the device can cause commands to be initiated at the processor 40 of the device by user interaction with the touchscreen display 24 without actuating the mechanical switch 30. For example, the user can touch or slide a finger along the touchscreen display causing the generation of signals and the initiation of commands without applying sufficient force to cause actuation of the single mechanical switch 30. On the other hand, application of sufficient force results in the actuation of the single mechanical switch 30.

Figure 4:
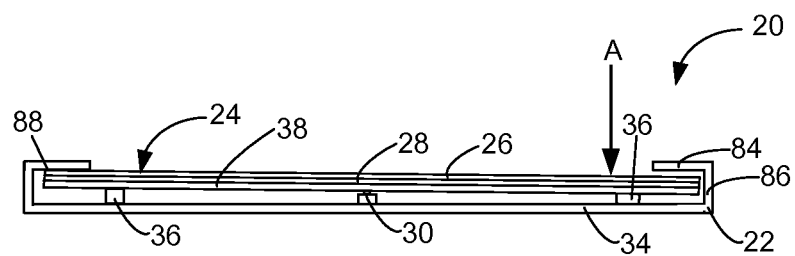
FIG. 4 is a sectional side view of the portable electronic device of FIG. 1, showing a force applied to a point on a touchscreen display.
Figure 5:
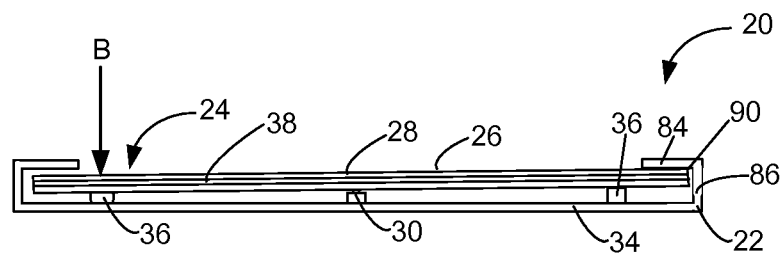
FIG. 5 is a sectional side view of the portable electronic device of FIG. 1, showing a force applied to another point on the touchscreen display.
Figure 6:
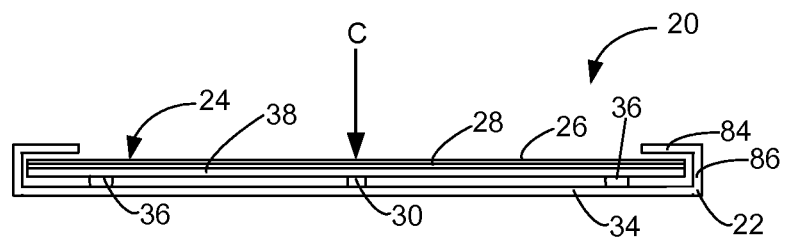
FIG. 6 is a sectional side view of the portable electronic device of FIG. 1, showing a force applied to another point on the touchscreen display.

Reference is now made to FIGS. 4 to 6 to describe movement of the touchscreen display 24 within the housing 22 of the portable electronic device 20. Referring first to FIG. 4, there is shown a sectional side view of portions of the portable electronic device 20, according to one embodiment in which a force is applied by, for example, a user pressing a finger into the touchscreen display 24, in the direction of the arrow "A". As shown, the user presses on the side of the touchscreen display 24, resulting in pivoting of the touchscreen display 24 such that the biasing elements 36 that are on the same side of the portable electronic device 20 to which the force is applied are compressed. It will be appreciated from the Figure that when a force is applied on one side of the touchscreen display 24, the touchscreen display 24 pivots against the underside of the frame 84, along an edge on the opposite side of the mechanical switch 30. In the example of FIG. 4, the biasing elements 36 on the right-hand side of the portable electronic device are compressed as the force is applied to the right-hand side of the touchscreen display 24. Further, with the force applied on the right-hand side, the touchscreen display 24 pivots against the underside of the frame 84 along the edge indicated by the number 88 on the left-hand side of the touchscreen display 24.

With the pivoting action caused by application of sufficient force to the touchscreen display 24, the single mechanical switch 30 is actuated, thereby providing the user with a desirable tactile quality during user interaction with the graphical user interface.

Referring now to FIG. 5, again there is shown a sectional side view of portions of the portable electronic device 20 according to one embodiment in which a force is applied by, for example, a user pressing a finger into the touchscreen display 24, in the direction of the arrow "B". Again, the user presses on the side of the touchscreen display 24, resulting in pivoting of the touchscreen display 24 such that the biasing elements 36 on the same side of the portable electronic device 20 are compressed. When the force is applied on one side of the touchscreen display 24, the touchscreen display 24 pivots against the underside of the frame 84, along an edge on the opposite side of the mechanical switch 30. In the example of FIG. 5, the biasing elements 36 on the left-hand side of the portable electronic device are compressed as the force is applied to the left-hand side of the touchscreen display 24. Further, with the force applied on the left-hand side, the touchscreen display 24 pivots against the underside of the frame 84 along the edge indicated by the number 90 on the right-hand side of the touchscreen display 24. Again, the single mechanical switch 30 is actuated with the pivoting action caused by application of sufficient force to the touchscreen display 24, thereby providing the user with a desirable tactile quality during user interaction with the graphical user interface.

Referring now to FIG. 6, again there is shown a sectional side view of portions of the portable electronic device 20 according to one embodiment in which a force is applied by, for example, a user pressing a finger into the touchscreen display 24, in the direction of the arrow "C". Again, the user presses on the side of the touchscreen display 24, resulting in movement of the touchscreen display 24 such that the biasing elements 36 of the portable electronic device 20 are compressed. In the present example, the user presses in the center of the touchscreen display 24, causing all of the biasing elements 36 to be depressed. Thus, in this example, the touchscreen display 24 does not pivot about an edge. Again, the single mechanical switch 30 is actuated with the movement of the touchscreen display 24 away from the frame 84 and toward the base of the housing caused by application of sufficient force to the touchscreen display 24. Thus, the user is again provided with a desirable tactile quality during user interaction with the graphical user interface.

Figure 7:
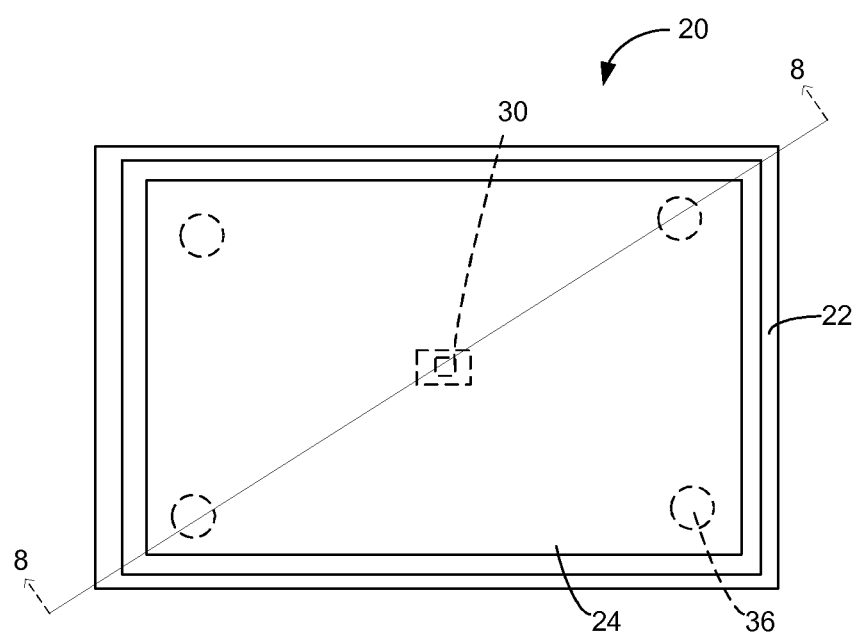
FIG. 7 is a top view of a portable electronic device according to another embodiment, with certain hidden features shown in ghost outline.
Figure 8:
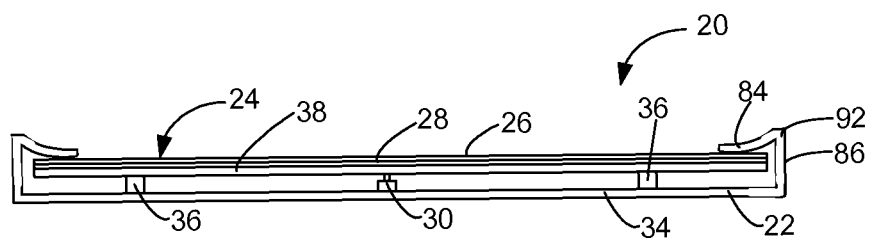
FIG. 8 is a sectional view along the line 8-8 of FIG. 7.
Figure 9:
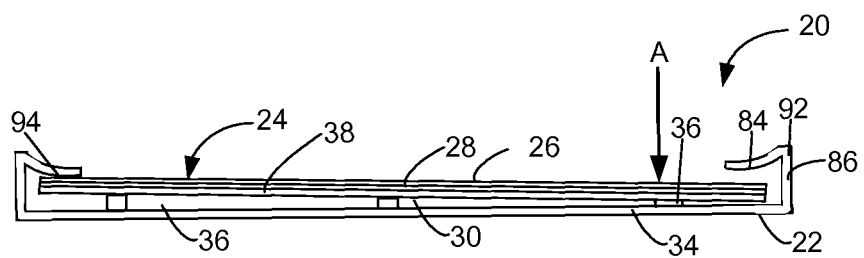
FIG. 9 is a sectional view along the line 8-8 of FIG. 7, showing a force applied to a point on a touchscreen display.

Reference is now made to FIGS. 7 to 9 to describe movement of the touchscreen display 24 within the housing 24 of a portable electronic device 20 according to another embodiment. Referring first to FIGS. 7 and 8, there is shown a top view and a sectional view along the line 8-8 of the portable electronic device 20 of FIG. 7. As best shown in FIG. 8, the frame 84 of the housing 22 includes corners 92 that are curled away from the base 34 of the housing 22. Thus, the frame 84 curls outwardly in an arc away from the base 34 and therefore away from the touchscreen display 24 towards the corners 92.

Referring now to FIG. 9, there is shown a view similar to FIG. 8 with a force applied by, for example, a user pressing a finger into the touchscreen display 24, in the direction of the arrow "D", proximal a corner of the touchscreen display 24. As shown, the user presses on the corner of the touchscreen display 24, resulting in pivoting of the touchscreen display 24 such that the biasing element 36 on the same corner 92 of the portable electronic device 20 is compressed. When a force is applied on one corner of the touchscreen display 24, the touchscreen display 24 pivots against the underside of the frame 84, along an edge 94 proximal the opposing corner. The opposing corner, however does not contact the frame 84. It will be appreciated that without a corner that is curled outwardly, the touchscreen display 24 pivots at a point at the corner of the touchscreen display 24, rather than along an edge, as the corner contacts the underside of the frame 84 when a force is applied at the opposing corner of the touchscreen display 24. Thus, the outwardly curled corners 92 of the frame 84 provide a contact edge where the touchscreen display 24 pivots about the frame 84 rather than a contact point, thereby reducing the chance of damaging the corner of the touchscreen display 24 during pivoting. Again, with the pivoting action caused by application of sufficient force to the touchscreen display 24, the single mechanical switch 30 is actuated, thereby providing the user with a desirable tactile quality during user interaction with the graphical user interface.

Figure 10:
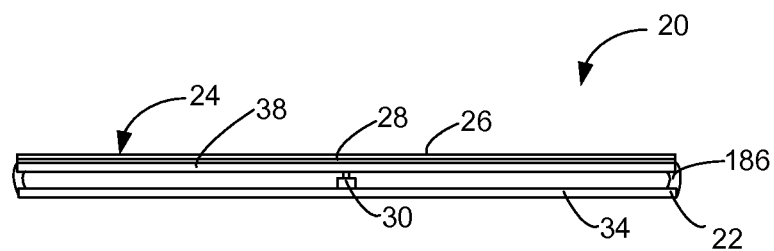
FIG. 10 is a sectional side view of a portable electronic device according yet another embodiment.
Figure 11:
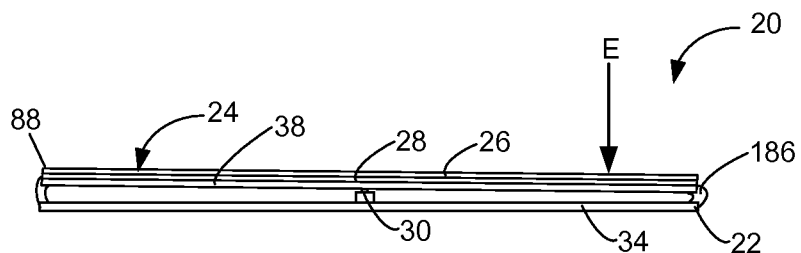
FIG. 11 is a sectional side view of the portable electronic device of FIG. 10, showing a force applied to a point on a touchscreen display.

Reference is now made to FIGS. 10 and 11 to describe another embodiment. According to the present embodiment, the housing 22 includes the base 34 and flexible sidewalls 186 extending between and connected to the base 34 and the touchscreen display 24. Again, the base 34 includes a plate (not shown) that is releasably attached for insertion and removal of, for example, the battery 68 and the SIM card 62 described above. The flexible sidewalls 186 can be made from any suitable flexible material such as any suitable elastomer. It will again be appreciated that the touchscreen display 24 includes an assembly of components including the touch sensitive input surface 26 overlying the LCD display device 28 and other components including optional components such as a backlight, held together by, for example, an edge support or by the rigid display support 38. Again, the touchscreen display 24 supported by the rigid display support 38 to provide structural support to the touchscreen display 24 and inhibit bending causing damage or breaking of the touchscreen display 24. The flexible sidewalls 186 are connected between the touchscreen display 24 and the base 34 by, for example, a mechanical interlock with between the touchscreen display 24 with the rigid support 38 and a mechanical interlock between the flexible sidewalls 186 and between the base 34 and the flexible sidewalls 186. Such a mechanical interlock can be formed by mechanically trapping the flexible sidewalls 186 during assembly of the touchscreen display 24 with the rigid display support 38 or can be overmolded. As in the above-described embodiments, the touchscreen display 24 is constrained by the housing 22 and is movable with respect to the housing 22. In the present embodiment, the flexible sidewalls 186 flex to when a force is applied into the screen to actuate the single mechanical switch and act to bias the touchscreen display 24 in a position in which the single mechanical switch 30 is not actuated.

As in the above-described embodiments, the single mechanical switch 30. The mechanical switch 30 is located between the touchscreen display 24 and the base 34 of the housing 22 and is centered with respect to the touchscreen display 24. Again, displacement of the touchscreen display 24 resulting from a user pressing the touchscreen display 24 causes actuation of the mechanical switch 30. In the present embodiment, the mechanical switch 30 is located such that the actuator is in contact with the display support 38. Thus, depression of the touchscreen display 24 by user application of a force thereto, causes actuation of the mechanical switch 30, thereby providing the user with a positive tactile quality during user interaction with the user interface of the portable electronic device 20.

The components including the processor 40 and other components described above with reference to FIG. 3 are housed within the housing 22 to provide the functionality of the portable electronic device 20. In the present embodiment, the flexible sidewalls 186 are continuous and extend around the periphery of the housing 22 and the touchscreen display 24, thereby providing a dust shield for the components housed in the housing 22. The functions of the single mechanical switch 30 and the touchscreen display 24 are similar to those already described above with reference to the previous embodiments.

Referring now to FIG. 11, there is shown a sectional side view of portions of the portable electronic device 20, according to the present embodiment in which a force is applied by, for example, a user pressing a finger into the touchscreen display 24, in the direction of the arrow "E". As shown, the user presses on the side of the touchscreen display 24, resulting in pivoting of the touchscreen display 24 such that the flexible sidewalls 186 that are on the same side of the portable electronic device 20 to which the force is applied are compressed. It will be appreciated from the FIG. 11 that when a force is applied on one side of the touchscreen display 24, the touchscreen display 24 pivots with respect to the base 34 of the housing 22. In the example of FIG. 11, the flexible sidewalls 186 on the right-hand side of the portable electronic device 20 are compressed as the force is applied to the right-hand side of the touchscreen display 24. Further, with the force applied on the right-hand side. With the pivoting action caused by application of sufficient force to the touchscreen display 24, the single mechanical switch 30 is actuated, thereby providing the user with a desirable tactile quality during user interaction with the graphical user interface.

According to one aspect there is provided a portable electronic device. The portable electronic device comprises a housing including a front frame, a moveable touchscreen display framed by the front frame of the housing, the touchscreen display including a touch-sensitive input surface overlying a display device, the front frame including corners curved outwardly away from the surface of the touchscreen display, a mechanical switch disposed between a back surface of the touchscreen display and a base of the housing, and operational components including a processor within the housing and connected to the touchscreen display. The touchscreen display moves relative to the base resulting in actuation of the mechanical switch in response to application of sufficient force to the touchscreen display.

The use of a single mechanical switch 30 with the touchscreen display 24 that floats with respect to the housing 22 provides the user with a desirable tactile quality when the single mechanical switch 30 is actuated. Depressing any point on the touchscreen display 24 actuates the single mechanical switch 30. Surprisingly, the desirable tactile quality is obtained with a single mechanical switch, rather than multiple switches as, for example, multiple switches result in actuation of each switch at different times providing the user with a confusing and undesirable tactile quality.

While the embodiments described herein are directed to particular implementations of the portable electronic device, it will be understood that modifications and variations to these embodiments are within the scope and sphere of the present application. For example, the size and shape of many of the features of the portable electronic device can differ while still providing the same function. Many other modifications and variations may occur to those skilled in the art. All such modifications and variations are believed to be within the sphere and scope of the present application.

What is claimed is:

1. An electronic device comprising:
   a housing including a front frame;
   a moveable touchscreen display framed by the front frame of the housing;
   a switch disposed between the touchscreen display and the housing;
   a processor within the housing and connected to the touchscreen display,
   wherein the touchscreen display is moveable relative to the housing resulting in actuation of the switch in response to application of sufficient force to the touchscreen display;
   wherein the front frame has corners curved outwardly away from a surface of the touchscreen display.

2. The electronic device according to claim 1, wherein the switch provides tactile feedback through the touchscreen display upon actuation.

3. The electronic device according to claim 1, comprising at least one biasing element to bias the touchscreen display away from the switch.

4. The electronic device according to claim 3, wherein the at least one biasing element comprises foam disposed between a back surface of the touchscreen display and a base of the housing.

5. The electronic device according to claim 1, wherein the touchscreen display comprises a liquid crystal display.

6. The electronic device according to claim 1, comprising a display support on a back surface of the touchscreen display for providing support to the touchscreen display.

7. The electronic device according to claim 1, wherein sufficient force applied at any location on the touchscreen display results in movement of the touchscreen display to contact and actuate the switch.

8. The electronic device according to claim 1, wherein the switch is substantially centered in relation to the touchscreen display.

9. The electronic device according to claim 1, wherein an electrical signal is generated in response to actuation of the switch.

10. The electronic device according to claim 9, wherein the electrical signal is received at the processor as a further input in addition to the touchscreen display.

\* \* \* \* \*